(12) United States Patent
Lagarde et al.

(10) Patent No.: US 9,080,382 B2
(45) Date of Patent: Jul. 14, 2015

(54) METHOD FOR CONTROLLING A SCREEN, AND ACTUATOR SUITABLE FOR SUCH A METHOD

(75) Inventors: Eric Lagarde, Sallanches (FR); Frederic Maraval, Passy (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 14/236,707

(22) PCT Filed: Aug. 3, 2012

(86) PCT No.: PCT/EP2012/065226
§ 371 (c)(1),
(2), (4) Date: Feb. 3, 2014

(87) PCT Pub. No.: WO2013/020906
PCT Pub. Date: Feb. 14, 2013

(65) Prior Publication Data
US 2014/0174674 A1 Jun. 26, 2014

(30) Foreign Application Priority Data
Aug. 5, 2011 (FR) ...................................... 11 57196

(51) Int. Cl.
*H02P 5/00* (2006.01)
*H02P 1/54* (2006.01)
*E06B 9/68* (2006.01)
(Continued)

(52) U.S. Cl.
CPC ... *E06B 9/68* (2013.01); *E06B 9/32* (2013.01); *G05B 19/19* (2013.01); *E06B 2009/6845* (2013.01); *G05B 2219/45015* (2013.01)

(58) Field of Classification Search
USPC ............ 160/1; 318/34, 567, 568.23, 570, 573
See application file for complete search history.

(56) References Cited

U.S. PATENT DOCUMENTS 6,086,177 A * 7/2000 Driendl et al. ................. 318/466
6,283,190 B1 * 9/2001 Hu et al. ..................... 160/84.02
7,599,612 B2 * 10/2009 Moseley et al. ............... 388/811
(Continued)

FOREIGN PATENT DOCUMENTS

DE 10017775 A1 * 10/2001
EP 1148398 A2 * 10/2001
(Continued)

OTHER PUBLICATIONS

International Search Report dated Aug. 24, 2012, corresponding to PCT/EP2012/065226.

*Primary Examiner* — Paul Ip
*Assistant Examiner* — Said Bouziane
(74) *Attorney, Agent, or Firm* — Young & Thompson (57) ABSTRACT

A screen (1) includes a load bar (2), a flexible element (3) supporting the load bar, and a controlled member (4) for winding the flexible member, wherein the member is controlled according to a method that includes controlling the angular movement of the winding member (4) with a temporal set value (θ(t)) of the instantaneous angular position of the winding member, the temporal set value being predetermined from a profile representative of the desired instantaneous axial position for the load bar upon a movement between the first and second positions, using a polynomial function of a degree higher than or equal to 2, which approximates the relation between a value of the instantaneous axial position (H(t)) of the load bar and an instantaneous angular position (γ(t)) of the winding member (4).

11 Claims, 7 Drawing Sheets

(51) Int. Cl.
*G05B 19/19* (2006.01)
*E06B 9/32* (2006.01)

(56) References Cited

U.S. PATENT DOCUMENTS

| | | | |
|---|---|---|---|
| 8,125,165 B2 | 2/2012 | Cieslik | |
| 2003/0078692 A1* | 4/2003 | Heber et al. | 700/159 |
| 2004/0196768 A1* | 10/2004 | Watanabe | 369/53.28 |
| 2007/0221338 A1* | 9/2007 | Meewis et al. | 160/7 |
| 2008/0260363 A1* | 10/2008 | Carmen et al. | 388/811 |
| 2009/0001911 A1* | 1/2009 | Kayikci et al. | 318/254.1 |
| 2009/0204259 A1* | 8/2009 | Danko | 700/250 |
| 2009/0320372 A1* | 12/2009 | Marchetto et al. | 49/26 |
| 2010/0006240 A1* | 1/2010 | Cieslik | 160/405 |
| 2010/0018654 A1* | 1/2010 | Skinner et al. | 160/84.02 |
| 2011/0061818 A1 | 3/2011 | Geriniere et al. | |
| 2013/0314019 A1* | 11/2013 | Wilmes | 318/470 |

FOREIGN PATENT DOCUMENTS

| | | | |
|---|---|---|---|
| EP | 2 120 119 | | 11/2009 |
| FR | 2 898 994 | | 9/2007 |
| GB | 2378433 A | * | 2/2003 |
| WO | 2009150345 | | 12/2009 |

* cited by examiner

METHOD FOR CONTROLLING A SCREEN, AND ACTUATOR SUITABLE FOR SUCH A METHOD

FIELD OF THE INVENTION

The invention relates to a method for controlling a screen that comprises a load bar, a flexible element supporting this load bar and a controlled member for winding this flexible element. Such a flexible element can be a panel of a blind or of a roller blind, as well as a strap for suspending the load bar of a venetian blind, in particular a strap winding on itself.

BACKGROUND OF THE INVENTION

In order to harmoniously move the screens of a group of screens, it is known in EP-A-2 120 119 to determine for each screen a shift parameter between two reference positions, of which one is shared by the various screens of the group. It is also known in WO-A-2009/150345 to move the end of a screen when it becomes the farthest away from a shared position to be reached for a group of screens. It is finally known in U.S. Pat. No. 7,599,612 to take the winding diameter and the thickness of a flexible panel in order to configure a roller blind. This approach requires knowing the initial winding diameter and the thickness of the panel by taking two measurements when the load bar of a screen is at a predetermined distance from a reference position, for example one foot or two feet. It is required to successively bring the load bar into these two positions by taking measurements and validations which are delicate to implement and which take time.

It is these disadvantages that the invention intends more particularly to overcome by proposing a new method for controlling which is easier and faster to implement than those of prior art, more particularly that of U.S. Pat. No. 7,599,612.

To this effect, the invention relates to a method for controlling a screen comprising a load bar, a flexible element supporting the load bar and a controlled member for winding the flexible element, in order to move the load bar between a first high or low position and a second low or high position, this movement resulting from an angular movement of the winding member. This method is characterised in that it comprises at least one step wherein:

the angular movement of the winding member is controlled with a temporal set value of the instantaneous angular position of the winding member, with this temporal set value being itself determined, using a profile that represents the desired instantaneous axial position for the load bar during a movement between the first and second positions, using a polynomial function of a degree higher than or equal to 2 approximating the relation between a value of the instantaneous axial position of the load bar and an instantaneous angular position of the winding member.

SUMMARY OF THE INVENTION

Thanks to the invention, the movement of the load bar of the screen can be carried out based on the set value of the angular position of the winding member, with this position set value being calculated using the profile sought for the instantaneous axial position of the load bar, based on the polynomial function for approximation used. Alternatively to a calculation in real time, the movement of the load bar of the screen can be carried out once the curve of the set value of the angular position is determined.

According to advantageous but not mandatory aspects of the invention, such a method can incorporate one or several of the following characteristics, taken in any technically permissible combination:

The method comprises, a step a) of configuration consisting in approximating a function giving the instantaneous axial position of the load bar along an axis of translation of the load bar between its first and second positions, in the form of a polynomial function of the second degree f having for variable the instantaneous angular position of the winding member and which is expressed in the form $$H(t)=f(\gamma(t))=a\,\gamma(t)^2+b\,\gamma(t) \qquad \text{(Equation 1)}$$

where $H(t)$ is the instantaneous axial position of the load bar, $\gamma(t)$ is the instantaneous angular position of the winding member, t is an instant and a and b are two constant coefficients, The method comprises steps a), b), c), and d) of configuration consisting, for the step b), in determining, in at least two configurations, the value of the axial position of the load bar and the angular position of the winding member and, for the step c), in calculating, using the values determined in the step b), the coefficients a and b.

The method comprises a step d) of configuration consisting in choosing a profile that represents the desired instantaneous axial position for the load bar during its movement between the first and second positions, while the temporal set value used in the method is determined, for each instant t during the movement of the load bar between the first and second positions, as having an image by the polynomial function f equal to a value of the instantaneous axial position of the load bar corresponding to the profile chosen in the step d).

The step d) can intervene before or after the steps a) to c). Advantageously, the steps b) to e) are adjusting steps implemented during the entry into service of the screen, while the method is implemented during each displacement of the load bar.

It can, furthermore, be provided that the profile chosen during the step d) is selected from among a set of pre-established profiles.

The invention further relates to a method for controlling a group of screens, for example screens mounted on the same façade of a building, with these screens each comprising a load bar, a flexible element supporting the load bar and a controlled member for winding the flexible element, in order to move the load bar of each screen between a first high or low position and a second low or high position, with this movement resulting from an angular movement of the winding member.

This method is characterized in that it consists in implementing the steps a) to d) for each screen, by choosing, in the step d), the same profile for all of the screens or profiles that are coherent with one another, then in controlling each screen during the step of movement by implementing the method.

In the case of a method for controlling a group of screens, it can be provided that, when the first positions of the load bars are aligned together, the profile chosen in the step d) is the same for all of the screens.

The invention further relates to an electric actuator which is designed for the implementation of a method such as mentioned hereinabove within a screen that comprises a flexible element supporting a load bar, as well as a member for winding this flexible element, driven in rotation by the actuator. This screen is characterised in that it comprises means for controlling the actuator at the instantaneous set value determined according to the the method.

Advantageously, this actuator comprises means for calculating coefficients a and b in the step c) and/or determining the instantaneous value of the set value of the angular position in the the method.

Advantageously, means can be provided for selecting the profile chosen in the step d), from among a set of pre-established profiles.

Finally, the invention relates to a home automation installation that comprises at least one screen provided with an actuator such as mentioned hereinabove.

BRIEF DESCRIPTION OF THE DRAWINGS

The invention shall be better understood and other advantages of the latter shall appear more clearly in light of the following description of two embodiments of a method and of a screen in accordance with its principle, provided solely by way of example and made in reference to the annexed drawings wherein.

DETAILED DESCRIPTION OF THE INVENTION

Figure 1:
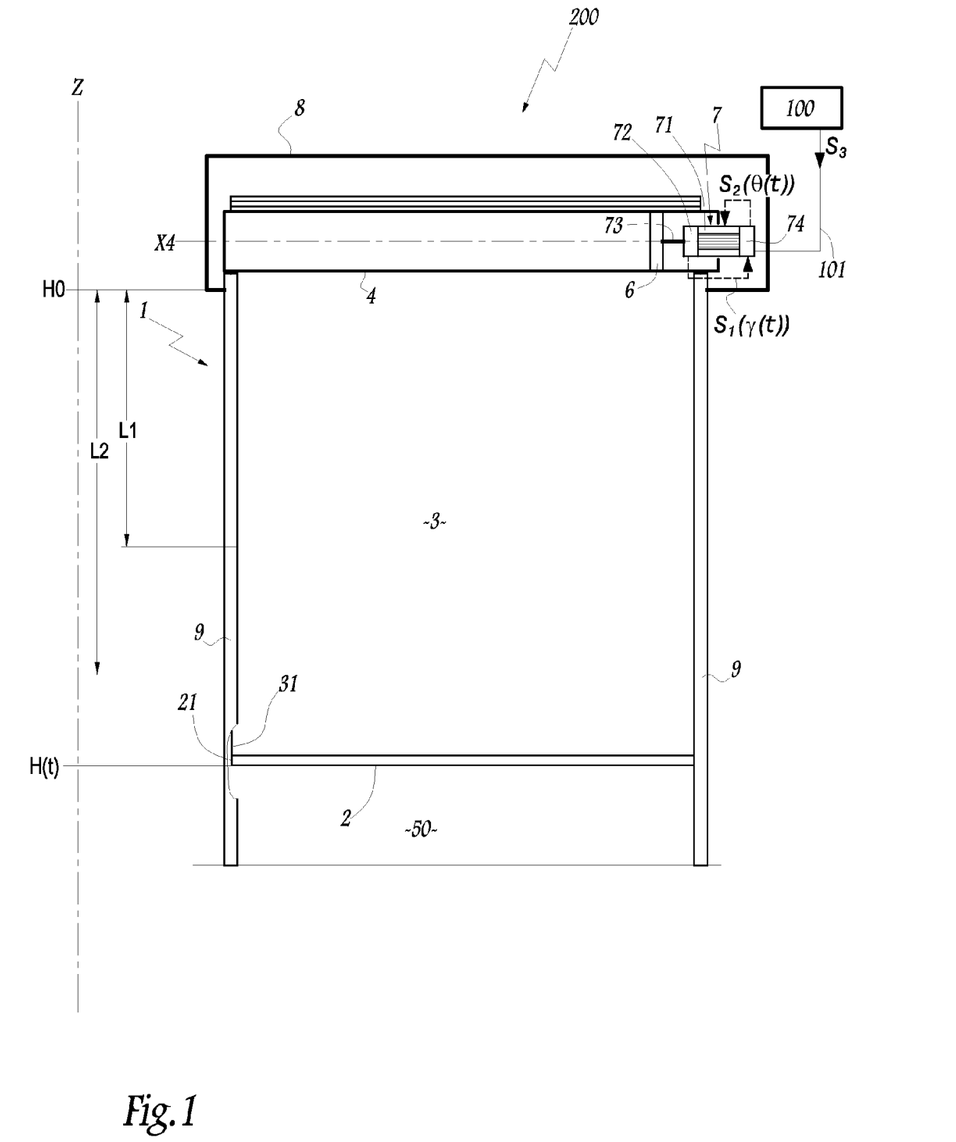
FIG. 1 is a block diagram of a screen in accordance with the invention and provided for the implementation of a method in accordance with the invention.

The screen 1 shown in FIG. 1 is of the windable blind type and comprises a load bar 2 mounted in the low portion of a panel 3 that can be wound around a winding tube 4 mobile in rotation around a horizontal axis X4. The panel 3 is intended to selectively obscure an opening 50 such as a window. The winding tube 4 rotates jointly with a crown 6 which is driven by an actuator 7 that comprises a direct current electric motor 71 as well as a sensor 72 of the angular position of the output shaft 73 of the motor 71. The sensor 72 makes it possible to determine the angular position of the shaft 73 using a predetermined reference position.

As can be seen in the extracted portion of FIG. 1, the ends 21 of the load bar 2 and the lateral edges 31 of the panel 3 are engaged in two sliders 9 arranged on either side of the opening 50.

Other types of screens can be used with the invention, in particular roller blinds, venetian blinds with or without slats that can be oriented, that each support a load bar and which are provided with straps, or blinds with a flexible panel and straps, with the straps lining the panel and supporting the load bar. The straps can then be wound on drums or on a winding tube that generally extends over the entire width of the opening to be 50 to be obscured.

The central shaft of the portion whereon is wound the windable element of the panel is defined as the winding shaft of the screen 1. In the example of the figures, this winding shaft is formed by the tube 4. In the case of a venetian blind, this winding shaft can be constituted by a shaft connecting two strap winding drums or by a drive shaft for such a drum.

The sensor 72 can for example be of the inductive or optical type. It detects the actual position $\gamma(t)$ of the winding shaft defined as hereinabove, here the winding tube 4, at each instant t.

The elements 5 to 7 are arranged in a housing 8 which is mounted in the upper portion of the opening 50 to be obscured with the screen 1.

A control unit 74 is integrated into the actuator 7. The sensor 72 is electrically connected to this unit to which it provides information concerning the instantaneous actual angular position y(t) of the winding tube 4, in the form of a first electric signal $S_1(\gamma(t))$.

The control unit 74 controls the motor 71 by supplying the latter based on a second electric signal $S_2(\theta(t))$ developed using an instantaneous set value $\theta(t)$, calculated by a controlling system included in the unit 74, for the value of the angular position of the winding shaft. The controlling system implements a control loop which is advantageously of the PID type.

The unit 74 is connected to a control box 100 by the intermediary of a wired connection 101 whereon flows electronic signals $S_3$ for controlling the screen 1. The box 100 is offset, i.e. arranged at a distance, in relation to the screen 1. The unit 74 can also emit to the box 100 a return signal not shown which contains information concerning the state and/or the position of the screen 1.

Alternatively, the connection between the elements 74 and 100 is wireless.

A vertical axis Z is considered in the vicinity of the opening 50 and of the screen 1. It is noted H(t) the position of the load bar 2 along the axis Z, with this position being measured in relation to a reference position H0 corresponding to the upper end of the opening 50, i.e. the position of the top end of travel of the load bar 2 during a raising movement of the latter.

This instantaneous axial position H(t) is directly perceived by an observer of the movements of the screen 1.

It is considered that the value of this instantaneous axial position H(t) can be expressed in the form of a polynomial function of the second degree f having for variable the instantaneous angular position of the winding shaft, which corresponds to the variable $\gamma(t)$ detected by the sensor 72, as explained hereinabove.

As such, at each instant t during a movement of the load bar 2, its position along the axis Z can therefore be expressed as follows:

$$H(t) = f(\gamma(t)) = a\,\gamma(t)^2 + b\,\gamma(t) \qquad \text{(Equation 1)}$$

where a and b are two constant coefficients without a unit defining the function f.

This choice of a function of approximation of the instantaneous axial position H(t) of the load bar 2 makes it possible to implement calculations that, as explained hereinafter, favour an effective controlling of the actuator 7.

In practice, the coefficients a and b depend on the nominal characteristics of the actuator 7, tolerances in manufacturing and the precision of the mounting of the screen 1 in relation to the opening 50. These two coefficients are determined by the calculation using the actual values measures in an installation 200 to which the screen 1 belongs.

A first axial length L1 is considered, equal for example to 1 m and a second axial length L2, equal for example to 1 m 50. In the example of FIG. 1, the case is considered wherein, in its course of travel between a low position and a high position, the load bar passes through positions that are separate from the reference position H0, respectively by the length L1 and by the length L2.

In this case, the following equations are verified:

$$L1 = a\gamma_1^2 + b\gamma_1 \quad \text{(Equation 2)}$$

and $$L2 = a\gamma_2^2 + b\gamma_2 \quad \text{(Equation 3)}$$

In the equations 2 and 3, the values $\gamma_1$ and $\gamma_2$ are those of the angular positions detected by the sensor 72 when the load bar is respectively below the position H0 by a length L1 or by a length L2.

In light of the system formed by the equations 2 and 3, the coefficients a and b can be determined through calculation, according to the magnitudes L1, L2, $\gamma_1$ and $\gamma_2$. This operation is carried out automatically by the unit 74 when the load bar 2 of the screen 1 has been successively brought into the positions corresponding to the lengths L1 and L2, the angular positions $\gamma_1$ and $\gamma_2$ then being detected automatically by the sensor 72 and sent, in the form of signals $S_1$, to the unit 74 which can carry out the aforementioned calculations.

Moreover, the movement profile of the load bar 2 during a raising or lowering movement is chosen in a database of profiles stored in a memory belonging to the unit 74. Each profile comprises a curve, in the form of a table or of a polynomial, of the type as that shown in FIG. 4 for the profile P1($t$) and representative of the instantaneous axial position H(t) of the load bar 2 when the latter is moved from a first position H1 to a second position H2, between two instants $t_1$ and $t_2$. The profile P1($t$) shown in FIG. 4 corresponds, between the instants $t_1$ and $t_2$, to a starting with progressive acceleration, then to a progressive slowing down.

Figure 4:
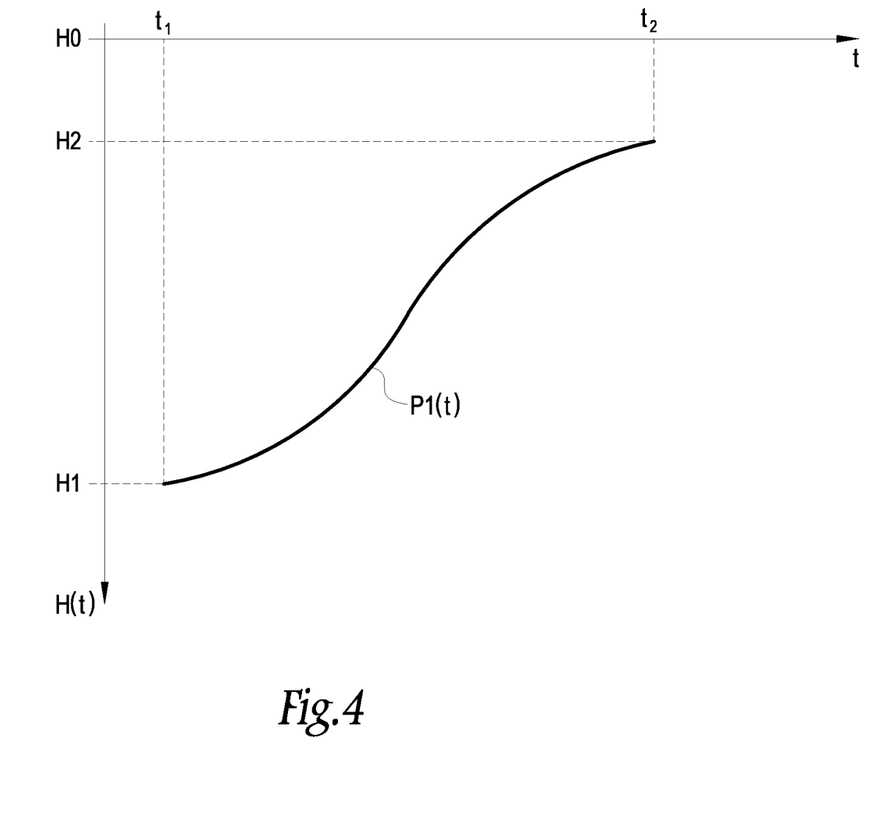
FIG. 4 is a block diagram of a profile that represents the position in height of the load bar of one of the screens of the installation of FIGS. 2 and 3, as a function of time, during the movement of these screens between the configuration of FIG. 2 and that of FIG. 3.

If, as considered hereinabove, the profile P1($t$) is chosen as having to by followed by the load bar 2 during the movement of the latter between two positions H1 and H2, then the following equation is satisfied at each instant t:

$$H(t) = P1(t) \quad \text{(Equation 4)}$$

This equation 4 represents a set value for the instantaneous axial position H(t) of the load bar 2.

In order to satisfy this set value, the actuator 7 is controlled thanks to a temporal set value of the position θ(t) of its winding shaft. In other words, the movements of the winding tube 4 and of the shaft 73 are controlled according to the set value θ(t).

Based on the approximation mentioned hereinabove, this set value θ(t) must satisfy the equation 1 with regards to the profile P1. In other words, the following equation must be satisfied:

$$P1(t) = a\,\theta(t)^2 + b\,\theta(t) \quad \text{(Equation 5)}$$

This equation 5 shows that there is a transfer function between the set value of the angular position θ(t) and the selected profile P1($t$). In other words, the set position of the angular position θ(t) is the solution of an equation of the second degree which is expressed in the form $$a\,\theta(t)^2 + b\,\theta(t) - P1(t) = 0 \quad \text{(Equation 6)}$$

This solution can be expressed in the form:

$$\theta(t) = \frac{-b + \sqrt{b^2 + 4aP1(t)}}{2a} \quad \text{(Equation 7)}$$

In other words, the temporal function θ(t) giving the set value used to control the actuator 7 during a movement can be expressed as a function of the coefficients a and b determined previously and as a function of the selected profile P1($t$).

It is observed that the determination of the instantaneous value of the set value of the angular position is carried out without having to know the diameter of the winding tube 4 or the thickness of the panel 3.

Figure 2:
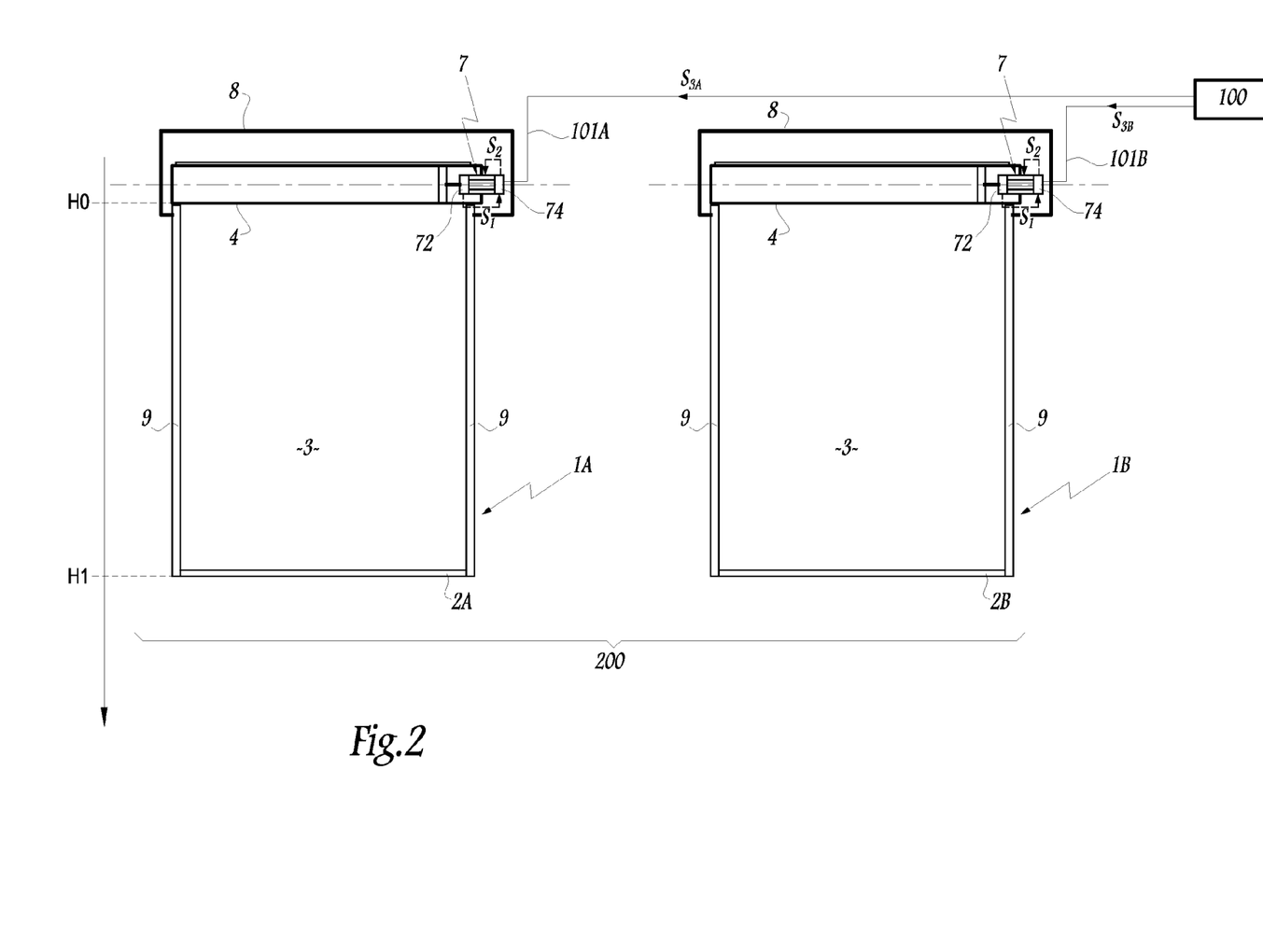
FIG. 2 is a block diagram of an installation in accordance with the invention comprising two screens such as that of FIG. 1 each controlled by a method in accordance with the invention, with these screens being in a first position.
Figure 3:
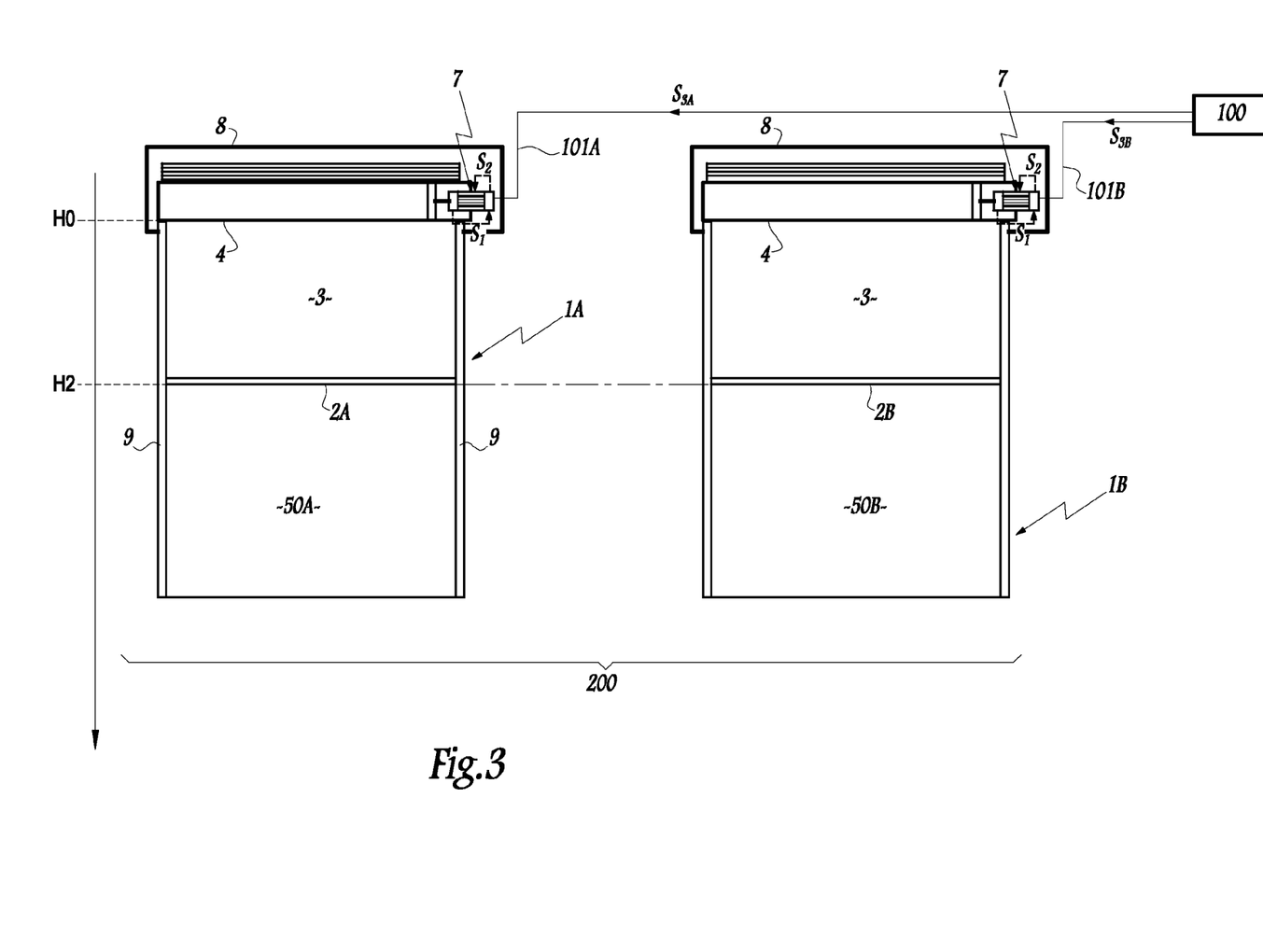
FIG. 3 is a view similar to FIG. 2, when the screens are in a second position.

The invention can be implemented in the framework of an installation 200 such as that shown in FIGS. 2 and 3 wherein several screens of the type of the screen 1 are used. In the figures, the installation 200 comprises two screens 1A and 1B. In practice, the number of screens is chosen according to the number of openings of a building to be obscured and it can be largely greater than two.

In FIGS. 2 and 3, the two screens used 1A and 1B are of the type of the screen 1 shown in FIG. 1. The references of the elements that comprise the screens 1A and 1B bear the same references as those of the screen 1 of FIG. 1, except for the load bars which are respectively referenced as 2A and 2B. Each actuator 7 has its own control unit 74. An offset control box 100, connected by wireless connections 101A and 101B to the units 74, is used to control the movement of the two screens simultaneously, thanks to electronic signals $S_{3A}$ and $S_{3B}$ sent respectively by the box 100 to the units 74 of the screens 1A and 1B. According to an alternative of the invention, the control box 100 incorporates a control unit common to the two screens. According to another alternative, the connection between the box 100 and the units 74 is wireless.

It is considered that the two openings 50A and 50B obscured by the screens 1A and 1B are aligned, in that their respective upper limits are located at the same height, noted as H0 through convention, and that their respective lower limits are also situated at the same height.

In FIG. 2, the two screens are in low configuration, in that their respective load bars 2A and 2B are each at a minimum height H1 in relation to the height H0, i.e. at a maximum distance in relation to the reference H0.

Consider the case whereon it is desired to bring the two screens 1A and 1B into the configuration of FIG. 3 where their load bars are at the same height H2 greater than the height H1. In other words, it is desired to raise the load bars 2A and 2B from the height H1 to the height H2.

One of the objectives of the invention is that the movement of the two screens 1A and 1B is harmonious, i.e. that this movement is perceived as being synchronised or "unitary" by an observer looking at a façade wherein are arranged the two openings 50A and 50B.

To do this, each actuator 7 receives a position command from the group control box 100, for example "positioning of the load bar at 10% of the total course of travel", or "complete opening". Each actuator is then controlled by its control unit 74 thanks to a temporal set value of the angular position of its winding shaft.

More precisely, each actuator 7 is controlled with a law of predetermined movement of the type θ(t) where θ is the instantaneous angular position of the winding shaft and t is an instant, as explained hereinabove.

The value θ(t) is used at each instant t by the unit 100 as a set value in order to control each actuator 7. It is included in the signal $S_2$ sent to the motor 71 by the unit 74 within the actuator. In other words, a unit 74 controls the operation of the actuator at which it belongs to the value θ(t), for each instant t of the movement of the load bars 2A and 2B, between the positions corresponding to the heights H1 and H2.

As such, when a movement has to be controlled starting with an instant $t_0$, for example for the screen 1A, the instantaneous movement set value θ(t) for each instant, starting from $t_0$, is calculated by a computer of the unit 74 of this screen. This set value θ(t) is then used to control the actuator 7, in such a way that the actual position γ(t) of the winding shaft of the actuator 1A is equal to or is the most equal possible to the value θ(t), for each instant, with this value γ(t) being detected by the sensor 72 and used as a counter-reaction value in a control loop implemented in the unit 74 of the screen 1A.

The value of θ(t) is calculated by applying the equation 7 mentioned hereinabove before this value is used to control the movement of the load bar 2A and 2B of the screens 1A and 1B.

If, during the raising of the load bar 2A of the screen 2, the latter encounters an obstacle in the slide 9, for example the head of a screw which has become progressively loose, the load bar 2A is momentarily slowed down, when passing this obstacle. This is detected because the value of the actual angular position γ(t) of the rotor then move away from the set value θ(t) for at least one instant t following the encounter of the load bar 2A with the obstacle. In the sense that the actuator 7 of the screen 1A is controlled with the temporal set value θ(t) of the instantaneous angular position for its winding shaft, a position error and therefore the delay taken by the bar 2A in its movement between the positions H1 and H2, in relation to the bar 2B of the screen 1B, is compensated: this delay is detected by the sensor 72 which informs the unit 74 of it thanks to the signal $S_1(γ(t))$ which acts on the motor 71 in order to temporarily accelerate its rotation and again align the actual angular position γ(t) of the winding shaft on the temporal set value θ(t) of the angular position for the rest of the course of travel.

Preferably, the acceleration is not immediate and the instantaneous angular position γ(t) of the winding shaft can remain temporarily deviated in relation to the temporal set value θ(t) of the angular position. Due to the controlling, and in particular to its dynamic performance, an acceleration of the winding is then generated without any sudden movements in order for the instantaneous angular position γ(t) to coincide with the temporal set value θ(t) of the angular position.

As such, even in the case of a momentary delay of the screen 1A in relation to the screen 1B, this delay is offset, in such a way that the movement of the two screens 2A and 2B is harmonious.

In the example of FIGS. 2 and 3, the positions of the top and bottom end of travel of the load bars 2A and 2B are aligned and it is possible to choose the same profile P1(t) for the desired instantaneous axial position for these load bars during their respective movements. As such, if these load bars start from the same position, from the end of travel or from the same intermediate position, they will have a coordinated movement.

Figure 5:
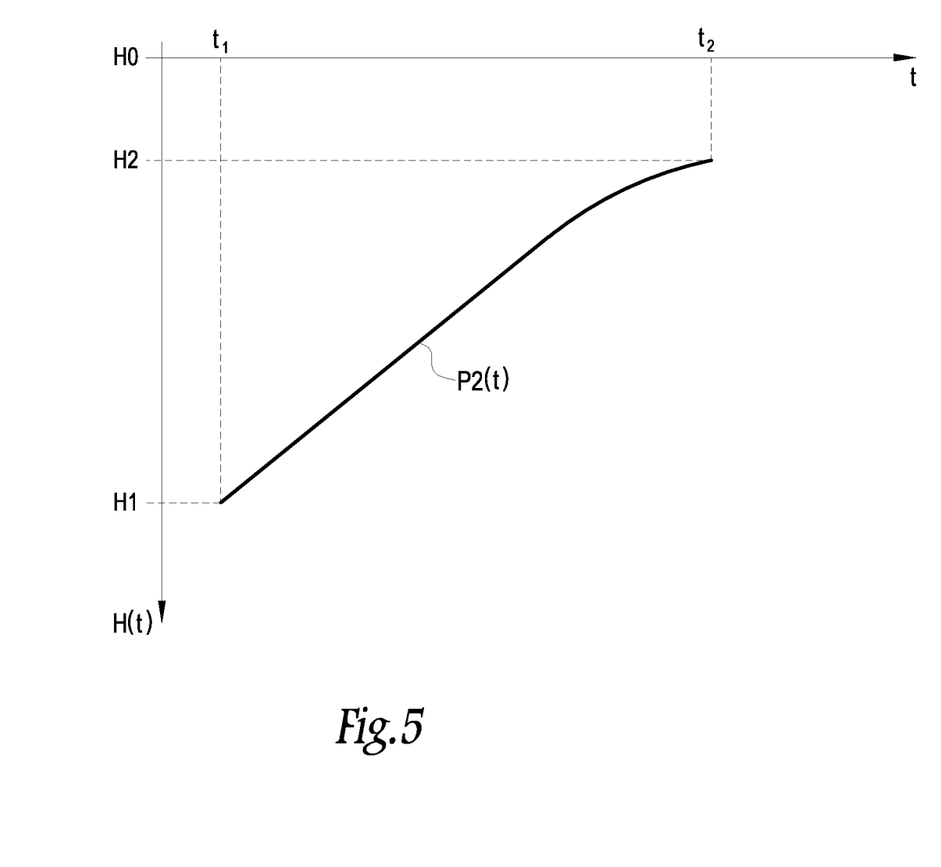
FIG. 5 is a view similar to FIG. 4 for another profile that can be used with the installation of FIGS. 2 and 3.

The profile P1(t) of FIG. 4 is not the only one possible and the profile P2(t) shown in FIG. 5 can also be considered. Other profiles not shown can also be used with the invention. They are stored in a memory of the unit 74 or in memory of the box 100 and can be selected individually by the installer during the putting into service of the installation 200. In this case, means not shown, such as a programming console, make it possible to select one of the profiles.

Alternatively, a single profile, for example the profile P1(t), is stored in the memory of the unit 74. In this case, the profile used is systematically chosen as equal to this stored profile.

Figure 6:
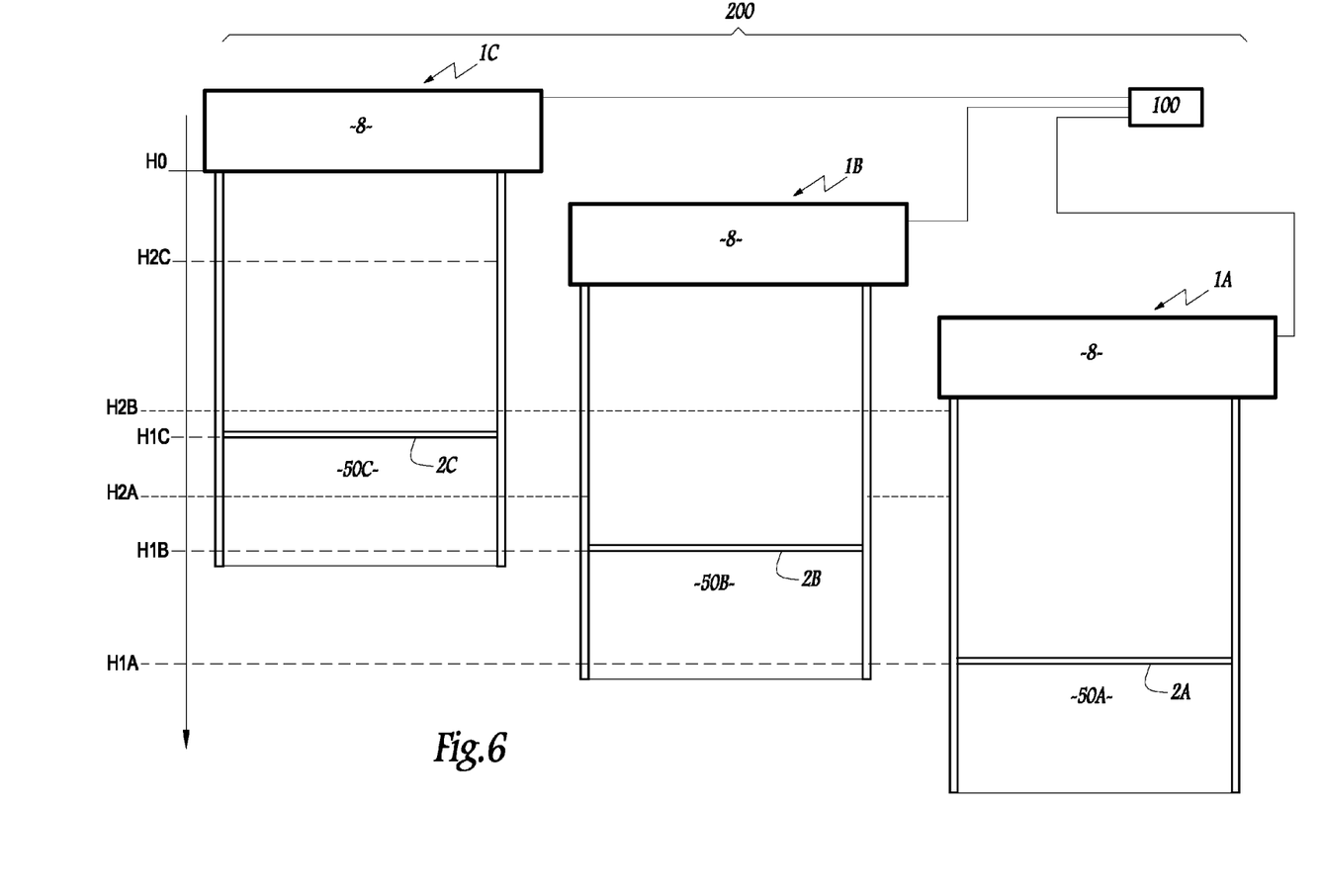
FIG. 6 is a block diagram of a second installation in accordance with the invention comprising three screens controlled by a method in accordance with the invention and FIG. 7 shows a profile used for controlling the screens of the installation of FIG. 6.

The invention can also be used in the case of several screens arranged on openings 50A, 50B and 50C arranged at different levels in relation to one another, as shown for the installation 200 of FIG. 6 where the housings of the screens 1A, 1B and 1C are shown as an outside view. These screens are identical to the screen 1 of FIG. 1 and each further comprises an actuator and a winding shaft formed here by a winding tube, of the type of the tube 4.

It is considered that the load bar 2A of the screen 1A must pass from a position corresponding to the height H1A to the height H2A in relation to a reference height H0 corresponding to the high neutral point of the trajectory of the load bar 2C of the highest screen 1C.

In the same way, it is considered that the respective load bars 2B and 2C of the screens 1B and 1C must pass from the position H1B, respectively H1C, to the position H2B, respectively H2C.

Figure 7:
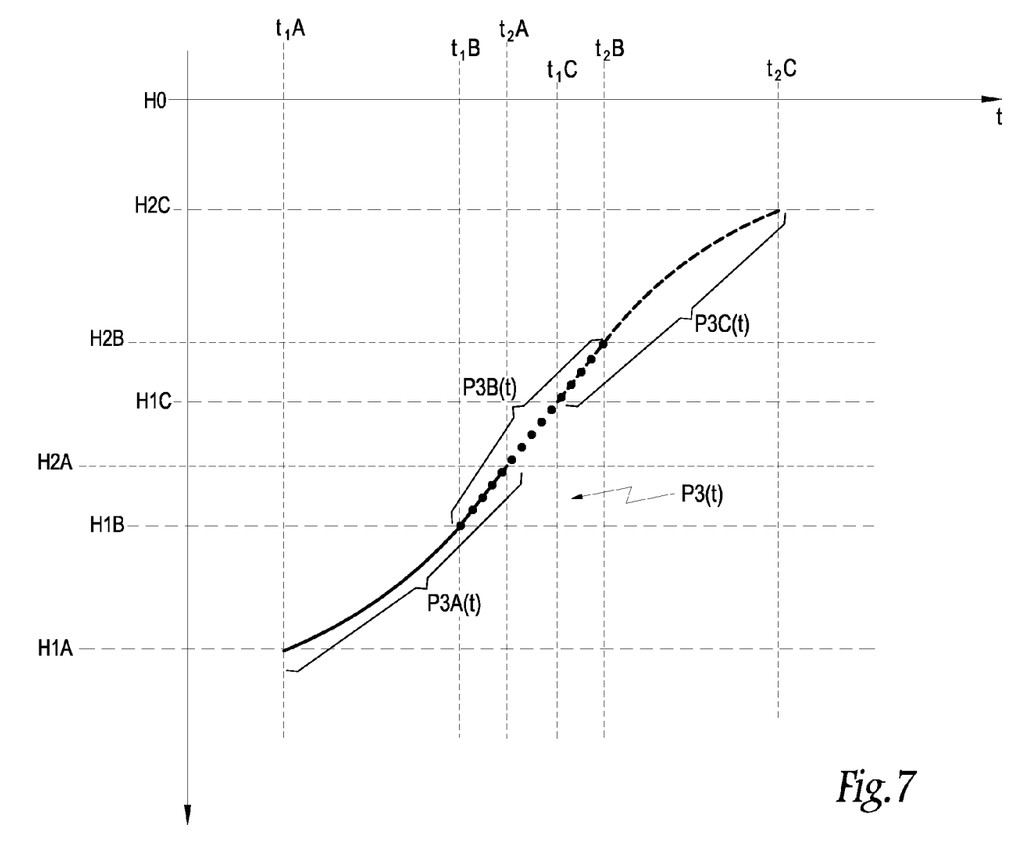

In this case, the profile P3(t) used can be that shown in FIG. 7, which is composite, in that it comprises a portion P3A(t), a portion P3B(t) and a portion P3C(t) dedicated respectively to the controlling of the load bars 2A, 2B and 2C. In FIG. 7, the portion P3A(t) is shown as a solid line, the portion P3B(t) with circles and the portion P3C(t) as a dotted line. As can be seen in FIG. 7, these portions overlap.

By implementing the method of the invention, i.e. by determining the coefficients a and b as explained hereinabove, then by calculating instantaneous set values for each of the screens 1A, 1B and 1C, it is possible to obtain a coordinated movement, according to the profile P3(t), of the load bars 2A, 2B and 2C which have an apparently shared trajectory, as if a single load bar was moving successively in the openings 50A, 50B and 50C obscured by the screens 1A, 1B and 1C.

Regardless of the embodiment, the coefficients a and b are proper to each screen.

A synchronised starting of the various screens of a group of screens makes it possible to coordinate the harmonious displacement of their load bars.

In terms of equipment, the invention is relatively simple to implement since it is sufficient to use a sensor 72 in conjunction with a control unit 74 in each actuator 7 programmed in a suitable manner to calculate the coefficients a and b and the function θ(t), then control the movement of the load bars 2 between their respective starting and ending positions, in relation to the temporal set value of the instantaneous angular position θ(t) of the winding shaft.

Alternatively, the motor 71 can by of the asynchronous type.

According to another alternative, the sensor 72 can be dissociated from the electric motor 71 and mounted at the opposite end of the shaft 6, as long as it makes it possible to know the instantaneous angular position of the winding shaft.

When several screens 1A, 1B etc. are associated, each is controlled by its own means of controlling. Alternatively, it could be considered that their means of controlling be logically connected together in order to control them in a coordinated manner. In both cases, the same temporal set value of the instantaneous angular position can be used to control the different screens of a set. As such, when their respective starting and ending positions are aligned, a coordinated movement of the various screens is obtained.

The invention is described hereinabove in the case where their own controlling means, formed by the elements 72 and 74, are provided in each screen 1, 1A, 1B, etc. They make it possible to process the commands received from the box 100 which is common to the installation. Alternatively, the means for controlling are common to the various screens and the controlling function is common This approach requires a substantial flow of information between these controlling means and the actuators.

The invention is described hereinbelow in the case where the coefficients a and b are calculated by the unit 74 using values L1, L2, γ1 and γ2 in two configurations. Alternatively, this calculation can be carried out using corresponding values in more than two configurations, for example three or four, by averaging or by weighting the results obtained in each system of two equations with two unknowns of the type of equations 2 and 3.

The invention is described hereinabove in the case where the function f is a polynomial function of the second degree. It can be applied in the case where this polynomial function is of a higher degree, for example of the third or fourth degree.

The invention has been described in the case of a raising of the load bar of a screen. It also applies in the case where this load bar is lowered, for example in the case of a wedging of the winding shaft.

The examples hereinabove concern the case wherein the screens used are screens for closing or solar protection. The invention can also be used for a projection screen, in particular for video projection. This is particularly advantageous in the case of manoeuvring many screens, for the modification of the projection format.

In the installations of FIGS. 2, 3 and 6, an offset parameter can be defined for each screen 1A, 1B and/or 1C, by applying the technical teachings of EP-A-2 120 119.

The technical characteristics of the embodiments and alternatives considered hereinabove can be combined together.

The invention claimed is:

1. A method for controlling a screen comprising a load bar, a flexible element supporting the load bar, a controller comprising a set of pre-established profiles, and a controlled member for winding the flexible element, in order to move the load bar between a first high or low position and a second low or high position, this movement resulting from an angular movement of the winding member, the method comprising:

a) approximating a relation between an instantaneous axial position of the load bar at least over a portion of the load bar's movement between the first and second positions and an instantaneous angular position of the winding member via a polynomial function of the second degree $$H(t)=f(\gamma(t))=a\,\gamma(t)^2+b\,\gamma(t) \qquad \text{(Equation 1)}$$

where

H(t) is the instantaneous angular position of the load bar,

γ(t) is the instantaneous angular position of the winding member, t is an instant, a and b are two constant coefficients;

b) determining in at least two configurations, a value of the axial position of the load bar and the angular position of the winding member;

c) calculating using the values determined in step b) the coefficients a and b;

d) choosing a profile from among the set of pre-established profiles, that is representative of the desired instantaneous axial position for the load bar during its movement between the first and second positions; and e) controlling the angular movement of the winding member with a temporal set value of the instantaneous angular position of the winding member, this temporal set value being itself determined, using a profile from among the set of pre-established profiles, that is representative of the desired instantaneous axial position for the load bar during a movement between the first and second positions, by using a polynomial function of a degree higher than or equal to 2 which approximates the relation between a value of the instantaneous axial position of the load bar and an instantaneous angular position of the winding member.

2. The method according to claim 1, wherein the temporal set value used in the step e) is determined, for each instant during the movement of the load bar between the first and second positions, as having an image via the polynomial function equal to a value of the instantaneous axial position of the load bar corresponding to the profile chosen in the step d).

3. The method according to claim 2, wherein the profile, chosen during the step d) is selected from among a set of pre-established profiles.

4. An electric actuator designed for the implementation of the method according to claim 3 within a screen, comprising:
  first means for controlling the actuator at the instantaneous set value determined according to the step e); and
  second means for selecting the profile chosen, in the step d), from among a set of pre-established profiles.

5. A home automation installation comprising at least one screen provided with the actuator according to claim 4.

6. The method according to claim 1, wherein in implementing the steps a) to d) for each screen, by choosing, in the step d), the same profile for all of the screens or profiles that are coherent with one another, then in controlling each screen during each movement by implementing the step e).

7. The method according to claim 6, wherein, when the first positions of the load bars are aligned between them, the profile chosen in step d) is the same for all of the screens.

8. An electric actuator designed for the implementation of the method according to claim 1 within a screen, the actuator comprising means for controlling the actuator at the instantaneous set value determined according to the step e).

9. A home automation installation comprising at least one screen provided with the actuator according to claim 8.

10. An electric actuator designed for the implementation of the method according to claim 1 within a screen, comprising:
  first means for controlling the actuator at the instantaneous set value determined according to the step e); and
  second means for calculating coefficients a and b in the step c) and/or for determining the instantaneous value of the set value of the angular position in the step e).

11. A home automation installation comprising at least one screen provided with actuator according to claim 10.

* * * * *